United States Patent [19]

Gardner

[11] Patent Number: 4,804,832
[45] Date of Patent: * Feb. 14, 1989

[54] TWO DIRECTIONAL ANGLE OF ARRIVAL SYSTEM

[75] Inventor: Leland V. Gardner, Buellton, Calif.

[73] Assignee: Santa Barbara Research Center, Goleta, Calif.

[*] Notice: The portion of the term of this patent subsequent to Dec. 8, 2004 has been disclaimed.

[21] Appl. No.: 807,377

[22] Filed: Dec. 10, 1985

[51] Int. Cl.⁴ .................................................. G01J 1/20
[52] U.S. Cl. .................................. 250/203 R; 126/425; 356/141
[58] Field of Search .................... 250/203 R, 203 S; 126/425; 356/141, 152

[56] References Cited

U.S. PATENT DOCUMENTS

| 4,027,651 | 6/1977 | Robbins, Jr. ............... | 250/203 S |
| 4,349,733 | 9/1982 | Beam et al. ............... | 126/425 |
| 4,498,768 | 2/1985 | Holl ............................ | 250/203 R |
| 4,549,078 | 8/1985 | Monahan ................... | 250/203 S |

FOREIGN PATENT DOCUMENTS

| 0026859 | 2/1977 | Japan | 250/203 R |
| 0018059 | 2/1983 | Japan | 250/203 R |

Primary Examiner—Edward P. Westin
Assistant Examiner—Charles Wieland
Attorney, Agent, or Firm—W. C. Schubert; V. G. Laslo; A. W. Karambelas

[57] ABSTRACT

A compact and efficient two direction of arrival system which is responsive over a large incident solid angle. The system is operative to use relatively few detectors, simple and inexpensive optics in a small assembly, and a very wide field coverage.

10 Claims, 4 Drawing Sheets

TWO DIRECTIONAL ANGLE OF ARRIVAL SYSTEM

This invention was made with Government support under Contract No. F33615-82-C-1821 awarded by the Department of the Air Force. The Government has certain rights in this invention.

BACKGROUND OF THE INVENTION

The disclosed invention relates to optical direction of arrival systems, and is particularly directed to a two-directional optical direction of arrival system having a wide angle of response.

Optical direction of arrival systems are generally utilized to determine the direction of arrival of optical radiation such as laser radiation.

Presently known direction of arrival systems include image forming optical systems with detector arrays and discrete electronic processing for each detector.

Such presently known direction of arrival systems are complex, costly, and cumbersome. Further considerations of known direction of arrival systems include multiple detectors, each with its discrete electronics, spaced behind an aperture. In this method, angular resolution is determined by detector and slot size and the spacing between them. If orthogonal bar detectors are used, the number required is twice the ratio of the field of view to the resolution increment. If a matrix is used, the number required is the square of the ratio of the field of view to the resolution increment.

SUMMARY OF THE INVENTION

It would therefore be an advantage to provide a direction of arrival system which is compact and efficient.

It would also be an advantage to provide a direction of arrival system which is responsive over a large incident solid angle.

Another advantage would be to provide a direction of arrival system which uses a small number of detectors.

The foregoing and other advantages and features are provided by the invention in a direction of arrival system which includes simple, inexpensive optics, a simple assembly, a small number of detectors and very wide field coverage.

BRIEF DESCRIPTION OF THE DRAWINGS

The advantages and features of the disclosed invention will readily be appreciated by persons skilled in the art from the following detailed description when read in conjunction with the drawing wherein.

DESCRIPTION OF THE PREFERRED EMBODIMENTS

Figure 1:
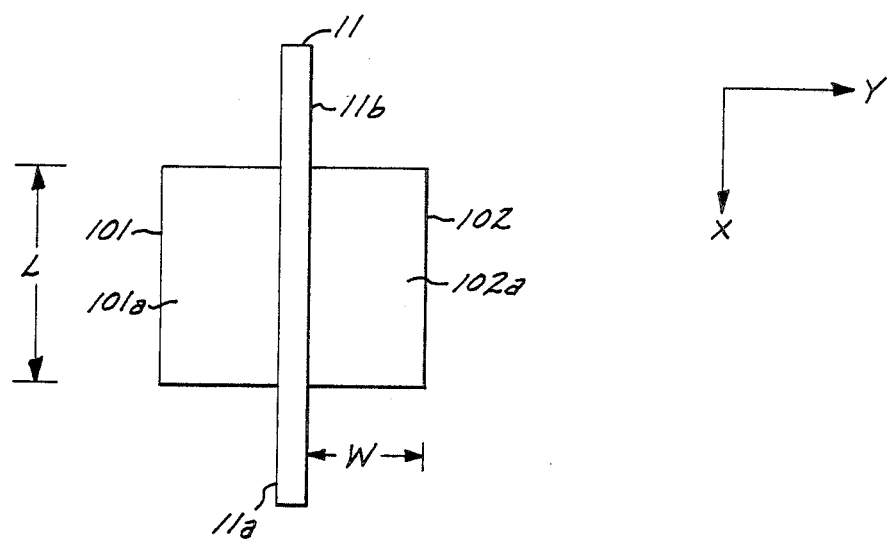
FIG. 1 is a top plan view of a detector assembly of the disclosed direction of arrival system.

In the following detailed description and in the several figures of the drawing, like elements are identified with like reference numerals.

The following discussion generally relates to determination of the direction of arrival of electromagnetic radiation on a detector array. For reference purposes, the direction of arrival shall be discussed relative to a three dimensional right-handed Cartesian coordinate system. In FIG. 1, which is characterized as a top plan view, the X and Y axes are shown while the Z-axis is understood to be orthogonal. In the elevational view of FIG. 2, the Y and Z axes are shown, while the X-axis is understood to be orthogonal.

For reference, the Z-axis can be considered as being along the center line (line of sight) of the external field of view which refers to the section in space over which the detector array can receive incident radiation for which direction of arrival can be determined. The direction of arrival is measured in the respective orthogonal planes formed by (a) the Z and X axes, and (b) the Z and Y axes. The incidence angle in the ZX plane shall be called $\theta_x$, and the incidence angle in the ZY plane shall be called $\theta_y$.

Stated another way, direction of arrival may be considered as a vector in three-dimensional space. Such direction vector includes components in the ZX and ZY planes. The angles formed by such components relative to the Z-axis are sufficient to define direction of arrival. Thus, direction of arrival may be considered an ordered pair $(\theta_x, \theta_y)$.

Figure 2:
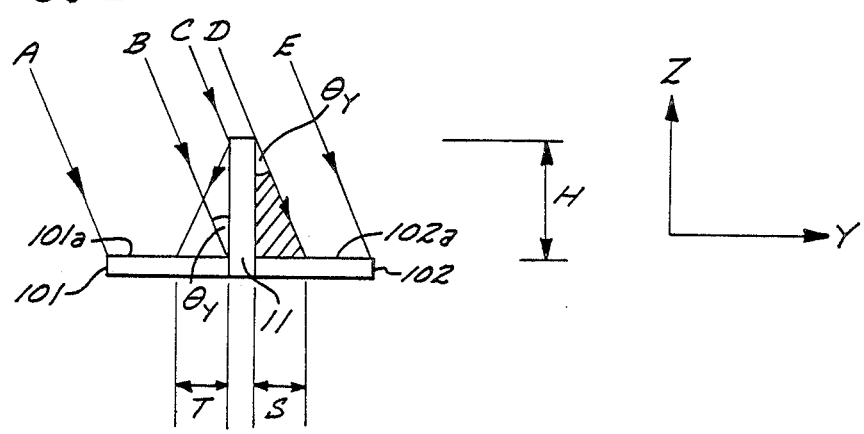
FIG. 2 is an elevational view of the detector assembly of FIG. 1.

Referring now to FIGS. 1 and 2, shown therein is a one-dimensional detector assembly 10 for the disclosed direction of arrival system. As shown, the detector assembly 10 provides information indicative of an incidence angle $\theta_y$.

The detector assembly 10 includes a first detector element 101 and a second detector element 102 which are separated by a mirror assembly 11. The detector elements 101, 102, respectively, have coplanar incident surfaces 101a, 102a. The mirror assembly includes parallel mirror surfaces 11a, 11b which are orthogonal to the detector element incident surfaces 101a, 102a.

Each of the detector elements 101, 102 is rectangular and has a length L that is parallel to the mirror surfaces 11a, 11b and a width W that is perpendicular to the mirror surfaces. The mirror surfaces 11a, 11b have a height H. Shown in FIG. 2 are rays A, B, C, D and E which are incident in a plane at an angle $\theta_y$. Rays between A and B irradiate the entire incident surface 101a of the detector 101. Rays between B and C reflect off the mirror surface 11a onto an area that is proportional to $(H \tan \theta_y)$ and is doubly illuminated as shown by D of FIG. 2. The output $D_{101}$ of the detector 101 is as follows:

$$D_{101} = K(W + H\tan\theta_y)(L) \tag{1}$$

where K is a proportionality constant.

The foregoing follows from the fact that the direct illumination contributes an amount proportional to the area of the incident surface which is $(W \times L)$; and the reflected illumination contributes an amount proportional to the incident surface area subject to the reflected illumination which is $(H\tan\theta_y)$.

For the shown incidence angle $\theta_y$, the detector 02 is irradiated by rays between D & E. The area of surface 102A to the left of ray D is in shadow, the area of the shadow, indicated by S in FIG. 2, is Htan $\theta_y$ (L). (It is important to understanding the concept to realize that the doubled area D and the shaded area S are equal.) The output of detector 102 is proportional to the full area minus the shaded area or:

$$D_{102} = K(W - H\tan\theta_y)L \tag{2}$$

The incidence angle $\theta$ may be determined by dividing the difference of the detector outputs by the sum of the detector outputs. The difference of the detector element outputs is:

$$D_{101} - D_{102} = K(W + H\tan\theta_y) - (W - H\tan\theta_y)) \tag{3}$$

$$D_{101} - D_{102} = K(2H\tan\theta_y) \tag{4}$$

The sum of the detector element outputs is:

$$D_{101} + D_{102} = K(W + H\tan\theta_y) + (W - H\tan\theta_y)) \tag{5}$$

$$D_{101} + D_{102} = K(2W) \tag{6}$$

Thus, the ratio $R_y$ of difference to sum is:

$$R_y = (H\tan\theta_y)/W \tag{7}$$

The incidence angle $\theta y$ is, therefore, determined as follows:

$$\theta_y = \tan^{-1}(R_y W/H) \tag{8}$$

It should be noted that for an incidence angle $\theta_y$ having a value greater than a maximum angle value $\theta_{max}$, the detector 102 will be totally in shadow and the incidence angle $\theta_y$ cannot be determined. Such maximum angle value $\theta_{max}$ is related to the width and height dimensions as follows:

$$W = H\tan\theta_{max} \tag{9}$$

$$\tan\theta_{max} = W/H \tag{10}$$

Since $\tan\theta_{max}$ is a constant for a given selection of width and height, the incidence angle may be determined as follows:

$$\theta_y = \tan^{-1}(RK_1) \tag{11}$$

where $K_1$ is $\tan\theta_{max}$ or $(W/H)$. It should be apparent that for equal width W and height H, $K_1$ is 1, and $\theta = 45°$.

It should be understood that the rays A, B, C, D, and E represent planes perpendicular to the plane of FIG. 2. Within each plane, the angle of incidence $\theta_x$ may vary. Thus, in order to determine $\theta_x$, another detector assembly similar to the detector assembly 10 and positioned orthogonally thereto is required.

Figure 3:
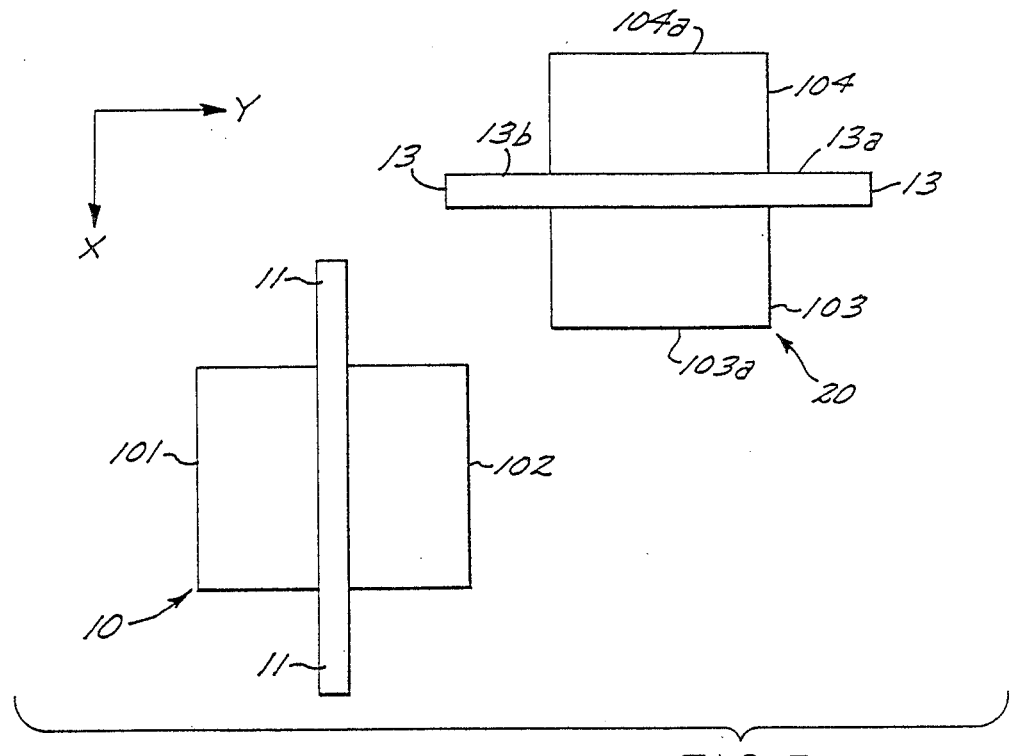
FIGS. 3-4 are a top plan view of an alternative configuration of the detector assembly of FIG. 1.
Figure 4:
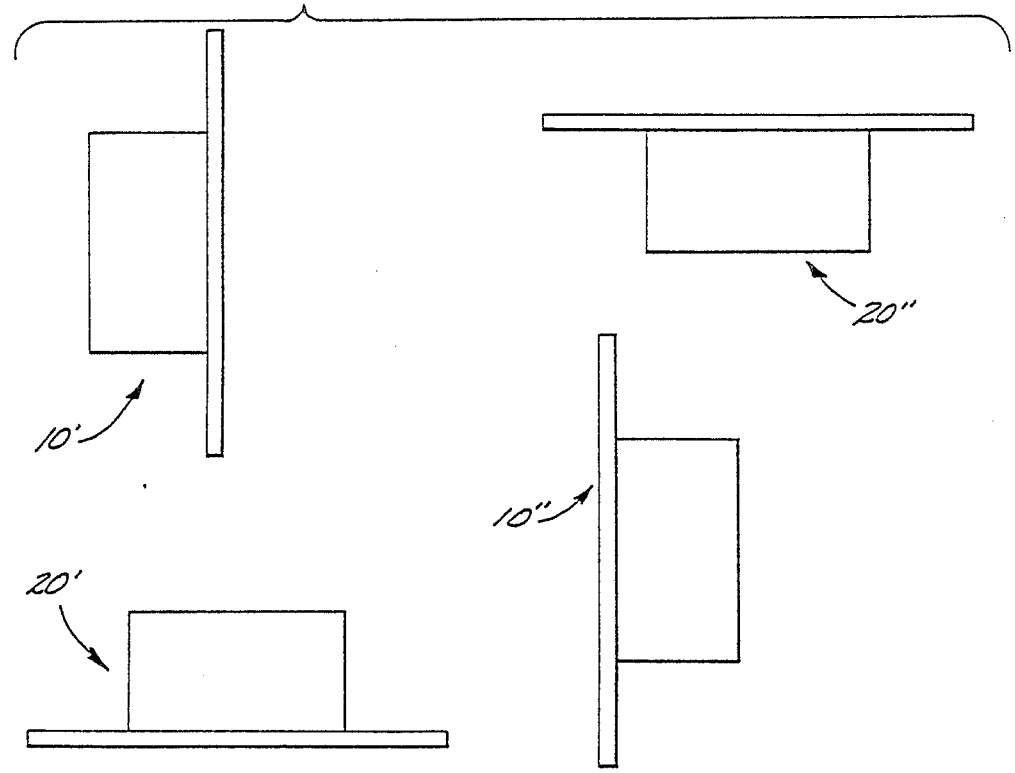

Referring now to FIG. 3, shown therein is the detector assembly 10 and another detector assembly 20 positioned orthogonally thereto. The detector assembly 20 includes a first detector element 103 and a second detector element 104 which are separated by a mirror assembly 13. The detector elements 103, 104, respectively, have coplanar incident surfaces 103a, 104a which may be coplanar with the incident surfaces 101a, 102a of the detector assembly 10. The mirror assembly 13 includes parallel mirror surfaces 13a, 13b which are orthogonal to the detector element incident surfaces 103a, 104a. Thus, the mirror surfaces 13a, 13b are orthogonal to the mirror surfaces 11a, 11b of the detector assembly 10.

Each of the detector elements 103, 104 is rectangular. It should be readily understood that the incidence angle $\theta_x$ can be determined in a manner similar to the determination of the angle $\theta_y$ as discussed above. Thus, the incidence angle $\theta_x$ is as follows:

$$\theta_x = \tan^{-1}(R_x K_2) \tag{12}$$

In the foregoing Equation 12, $R_x$ is the ratio of difference to sum of the outputs $D_{103}$, $D_{104}$ of the detector elements 103, 104:

$$R_x = (D_{103} - D_{104})/(D_{phd\ 103} + D_{104}) \tag{13}$$

$K_2$ is $\theta_{mas}$ or $(W/H)$. It should be apparent that for the dimensions of the detector assembly 20 that the maximum angle value $\theta_{mas}$ for the incidence angle $\theta_x$ is the same as the maximum angle value for the incidence angle $\theta_y$.

It should also be readily understood that the respective maximum values for the incidence angles $\theta_x$, $\theta_y$ may be readily controlled by choosing appropriate detector widths and mirror surface heights.

It should be understood that both systems 10 and 20 of FIG. 3 could be bisected by a line through the mirror length center. The four halves thus created could have any non-interfering physical location as long as they are in a homogeneous portion of the incoming irradiation pattern. One such configuration is shown as systems 10', 10", 20', 20" in FIG. 3A. Normally, it is desirable to keep the detectors close together to minimize the possibility of error due to incoming field non-uniformities, to minimize the package size and to facilitate cooling (when needed).

Figure 5:
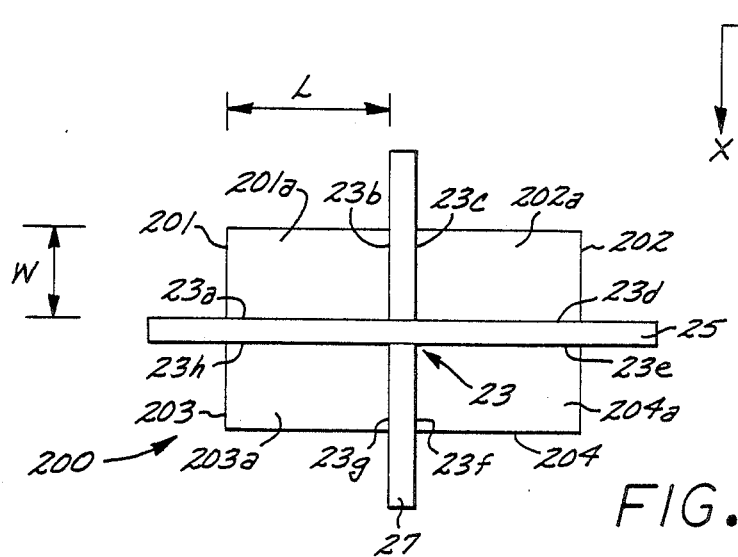
FIG. 5 is a top plan view of a detector assembly that is an alternative to that of FIG. 1.
Figure 6:
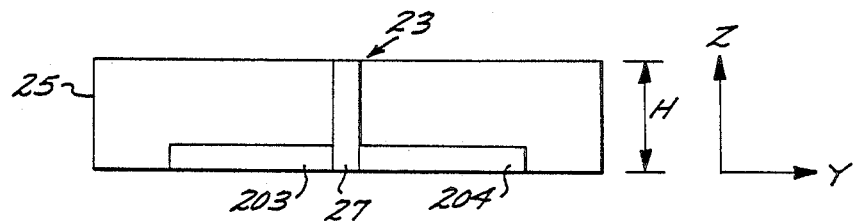
FIG. 6 is a side plan view of the detector assembly of FIG. 5.

Referring now to FIGS. 5 and 6 shown therein is a detector assembly 200 which may be utilized instead of the detector assemblies 10 and 20 in the direction of arrival system of FIG. 2. The detector assembly 200 includes four detector elements 201, 202, 203, 204 which have incident surfaces 201a, 202a, 203a, 204a that are preferably coplanar. The detector elements are separated by a cross-shaped mirror assembly 23 which includes two legs 25, 27 that are orthogonal to each other. Specifically, the detector elements are positioned in the vertexes of the cross-shaped mirror assembly 23.

The mirror assembly 23 includes mirror surfaces 23a through 23h, which are orthogonal to the incident surfaces of the detector elements 201, 202, 203, 204. The mirror surfaces 23a, 23d, 23e, 23h are parallel, and the mirror surfaces 23b, 23c, 23f, 23g are parallel. Each of the mirror surfaces has a height H above the plane of the incident surfaces of the detector elements.

Each of the detector elements 201, 202, 203, 204 has a width W parallel to the X-axis and a length L parallel to the Y-axis. From the previous analysis of the detector assemblies 10, 20, 200, it should be readily understood that each of the angles of incidence $\theta_x$, $\theta_y$ can reach maximum values, beyond which angles of incidence cannot be discriminated. Since the detector elements 201, 202, 203, 204 are not necessarily square, such maximum values may be different.

The maximum value $\theta_{xmax}$ for the incidence angle $\theta_x$ is expressed as follows:

$$\theta_{xmax} = \tan^{-1}(H/W) \tag{29}$$

The maximum value $\theta_{ymax}$ for the incidence angle $\theta_y$ is expressed as follows:

$$\theta_{ymax} = \tan^{-1}(H/L) \tag{30}$$

In a manner similar to the techniques discussed above relative to the detector assembly 200, the output of the detector elements 201, 202, 203, 204 are selectively combined to determine the incidence angles $\theta_x$, $\theta_y$.

Particularly, the incident angle $\theta_x$ is determined by considering the detector elements 201, 202 as a single detector element. The outputs of the detector elements 201, 202 are summed to provide a detector output DS1:

$$DS1 = D_{201} + D_{202} \tag{31}$$

The outputs of the detector elements 203, 204 are summed to provide a detector output DS2:

$$DS2 = D_{203} + D_{204} \tag{32}$$

The difference/sum ratio $R_x$ is expressed as follows:

$$R_x = (DS2 - DS2)/(DS1 + DS2) \tag{33}$$

By analogy to Equation 17 above, the incidence angle $\theta_x$ is determined as follows:

$$\theta_x = \tan^{-1}(R_x W/H) \tag{34}$$

In a similar manner, the incident angle $\theta_y$ can be determined by considering the detector elements 201, 203 as a single detector element and by considering the detector elements 202, 204 as another single detector element. The outputs of the detector elements 201, 203 are summed together to provide a detector output DS3:

$$DS3 = D_{201} + D_{203} \tag{35}$$

The outputs of the detector elements 202, 204 are summed together to provide a detector output DS4:

$$DS4 = D_{202} + D_{204} \tag{36}$$

The difference/sum ratio $R_y$ is expressed as follows:

$$R_y = (DS3 - DS4)/(DS3 + DS4) \tag{37}$$

The incidence angle $\theta_y$ is determined as follows:

$$\theta_y = \tan^{-1}(R_y L/H) \tag{38}$$

Figure 7:
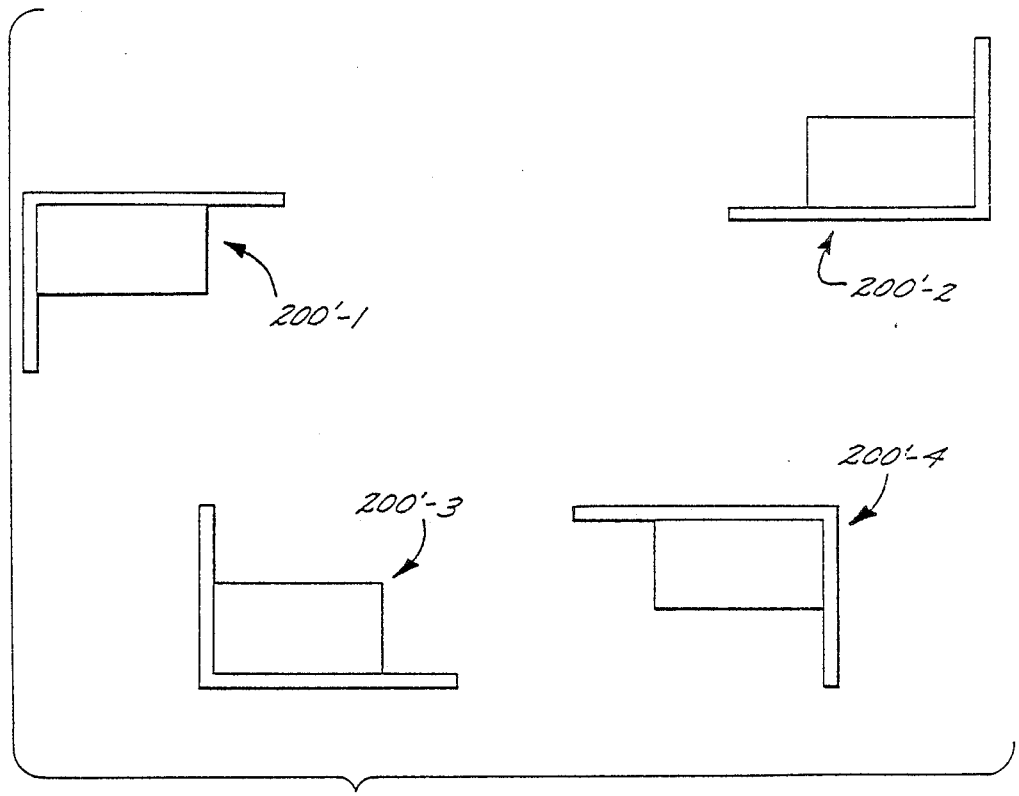
FIG. 7 is a side plan view of an alternative configuration of the detector assembly of FIG. 6.

It should be understood that detector system 200 could be quadrisected by lines through the center of mirrors 25 and 27. The four sectors thus created could be placed anywhere, or randomly, in a homogeneous incoming field and the detector array would be the same; one such configuration is shown as system 200' (1–4) in FIG. 7A. Normally, it is desirable to keep the detectors close together to minimize the possibility of error due to incoming field non-uniformities, to minimize the package size and to facilitate cooling when needed.

What is claimed is:

1. An optical direction of arrival system responsive to incident electromagnetic radiation, comprising:
    an even number of detector elements each of which is responsive to a distribution of incident electromagnetic radiation thereupon for providing respective detector outputs, each of said detector elements having an active radiation detecting surface having the shape of a right-angled parallelogram having edges which define a length and a width of said active radiation detecting surface, said detector elements being arranged in a predetermined configuration;
    reflecting means being operable for selectively reflecting incident electromagnetic radiation to said detector elements so that the detector elements may receive both direct and reflected incident electromagnetic radiation, said reflecting means further being operable for selectively obscuring incident electromagnetic radiation for preventing the reception of the incident electromagnetic radiation by said detector elements, said reflecting means being orthogonally disposed to said detector elements along at least one edge of said detecting elements; and
    processing means responsive to said detector outputs for determining the direction of arrival of incident optical signals as a function of the distribution of incident electromagnetic radiation on said detector elements.

2. The optical direction of arrival system of claim 1 wherein said plurality of detector elements includes four detector elements.

3. The optical direction of arrival system of claim 2 wherein said reflecting means provides reflections at planes which are perpendicular to said detector.

4. The optical direction of arrival system of claim 2 wherein said four detector elements are separated from each other by said reflecting means which includes reflecting surfaces perpendicular to the incident surfaces of said four detector elements.

5. The optical direction of arrival system of claim 2 wherein said four detector elements may be placed randomly.

6. The optical direction of arrival system of claim 4 wherein said reflecting means is a cross-shaped mirror assembly having two orthogonal legs respectively having parallel reflecting surfaces, and wherein each of said four detector elements is rectangular and positioned in one of the vertexes of said cross-shaped mirror assembly.

7. The optical direction of arrival system of claim 4 wherein said four detector elements may be placed randomly.

8. The optical direction of arrival system of claim 1 wherein said plurality of detector elements includes two detector elements.

9. The optical direction of arrival system of claim 8 wherein said reflecting means separates said two detector elements and includes first and second reflecting surfaces which are respectively orthogonal to said two detector elements.

10. The optical direction of arrival system of claim 9 wherein said reflecting means comprises a mirror assembly having parallel reflecting surfaces.

* * * * *